June 23, 1953 S. H. BERCH Re. 23,669

CONTAINER FLAP FOLDING APPARATUS

Original Filed Nov. 28, 1945 9 Sheets-Sheet 1

INVENTOR.
SAMUEL H. BERCH
BY
ATTORNEY

June 23, 1953 S. H. BERCH Re. 23,669

CONTAINER FLAP FOLDING APPARATUS

Original Filed Nov. 28, 1945 9 Sheets-Sheet 2

INVENTOR.
SAMUEL H. BERCH
BY
ATTORNEY

June 23, 1953 S. H. BERCH Re. 23,669

CONTAINER FLAP FOLDING APPARATUS

Original Filed Nov. 28, 1945 9 Sheets-Sheet 3

INVENTOR.
SAMUEL H. BERCH
BY
ATTORNEY

CONTAINER FLAP FOLDING APPARATUS

Original Filed Nov. 28, 1945 9 Sheets-Sheet 4

INVENTOR.
SAMUEL H. BERCH
BY
ATTORNEY

June 23, 1953 S. H. BERCH Re. 23,669

CONTAINER FLAP FOLDING APPARATUS

Original Filed Nov. 28, 1945 9 Sheets-Sheet 5

INVENTOR.
SAMUEL H. BERCH
BY
ATTORNEY

CONTAINER FLAP FOLDING APPARATUS

Original Filed Nov. 28, 1945 9 Sheets-Sheet 6

INVENTOR.
SAMUEL H. BERCH
BY
ATTORNEY

CONTAINER FLAP FOLDING APPARATUS

Original Filed Nov. 28, 1945 9 Sheets-Sheet 7

INVENTOR.
SAMUEL H. BERCH
BY
ATTORNEY

CONTAINER FLAP FOLDING APPARATUS

Original Filed Nov. 28, 1945 9 Sheets-Sheet 8

INVENTOR.
SAMUEL H. BERCH.
BY
ATTORNEY

CONTAINER FLAP FOLDING APPARATUS

Original Filed Nov. 28, 1945 9 Sheets-Sheet 9

INVENTOR.
SAMUEL H. BERCH
BY
ATTORNEY

Reissued June 23, 1953

Re. 23,669

UNITED STATES PATENT OFFICE 23,669

CONTAINER FLAP FOLDING APPARATUS

Samuel H. Berch, deceased, late of Beverly Hills, Calif., by Arden Farms Co., assignee, Los Angeles, Calif.

Original No. 2,500,922, dated March 21, 1950, Serial No. 631,331, November 28, 1945. Application for reissue January 19, 1953, Serial No. 332,130

3 Claims. (Cl. 53—96)

Matter enclosed in heavy brackets [ ] appears in the original patent but forms no part of this reissue specification; matter printed in italics indicates the additions made by reissue.

This invention relates to packaging devices, and particularly pertains to a packaging machine for ice cream and the like.

The present invention is applicable for use in packaging various products which are in a semi-fluid condition when packaged, but the invention has particular value in the packaging of ice cream to be dispensed in restaurants, catering establishments, soda fountains, and at retail. In dispensing ice cream it has been found that the sale of ice cream in bulk is unsatisfactory for the reason that the ice cream does not maintain a desired consistency and in addition will shrink. It is also common knowledge that the uniform scooping of ice cream from a bulk supply depends upon the skill and care of the dispenser. An additional disadvantage in dispensing from bulk is that water may be carried into the container with the scoop so that ice particles are formed, which render the ice cream unsaleable, and sanitary conditions attendant to the use of a scoop in a bulk container are not desirable. Due to these conditions the merchandiser of ice cream can never be certain of making a fixed profit since the profit may vary. This tends to promote a practice on the part of the merchandiser to skimp in the servings of ice cream or to substitute cheaper grades of ice cream from those which the character of his trade expects. From the merchandising standpoint there is also the objection that advertising does not create a sufficient demand for a particular advertised brand, since in sales from bulk, at least, the retail purchaser cannot identify the product from its appearance. It is therefore desirable to provide a means for packaging ice cream which will utilize a simple and inexpensive package such as disclosed in my co-pending application entitled "Carton for Ice Cream and the Like," filed October 31, 1944, and bearing Serial No. 561,235, which has matured into Patent Number 2,443,530, June 15, 1948, and by which merchandise may be identified and sold at a fixed profit without [reference to the] loss by shrinkage [,] *or* contamination [or] *by* unsanitary conditions. In order to accomplish these results and to meet competition of bulk ice cream manufacturers it is necessary to provide automatic means by which carton blanks may be folded, filled and closed, and it is the principal object of the present invention to provide a machine for packaging ice cream and the like involving the use of carton blanks as disclosed in the aforesaid application and in which machine blanks are consecutively withdrawn from a magazine, carried to forming means, and then consecutively to filling and closing stations, whereby the packaging may be accomplished rapidly and in a sanitary fully automatic operation.

The present invention contemplates the provision of a magazine for carton blanks, means for withdrawing the blanks from the magazine and thereafter placing them in a mold while passing the blank through a folding die by which it will be folded and shaped to conform to the mold, then moving the molds with their folded blanks to a dispensing unit to which ice cream is delivered from bulk and from which it is discharged into the container in accurately measured quantities, and after which the container is closed, all of said operations taking place along the length of travel of an endless conveyor mechanism.

The invention is illustrated by way of example in the accompanying drawings in which.

Figure 14:
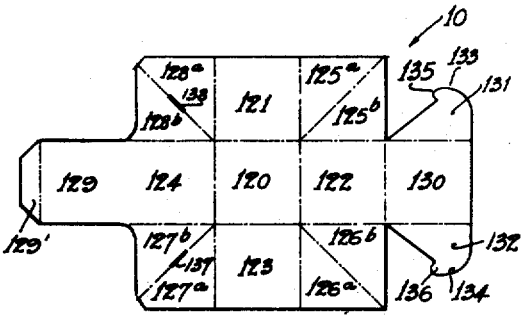
Fig. 14 is a view in plan showing the blank from which the carton is formed.

Referring particularly to Fig. 14 of the drawings, a carton blank is shown with which the present invention is particularly concerned although it is to be understood that the mechanism involving the present invention may be adapted for use with blanks of other designs. The carton blank, here indicated at 10, is designed to form a cube-shaped container, the details of which are specifically set forth in my copending application entitled "Carton for Ice Cream and the Like," Serial No. 561,235, filed October 31, 1944 *now U. S. Patent Letters No. 2,443,530*. Generally considered, the present invention is concerned with a machine equipped with magazines to receive a quantity of the blanks 10, to thereafter fold and form said blanks, and to then carry the folded cartons to means by which measured quantities of ice cream may be discharged into the cartons in register therewith and after which the carton may be completely closed and its parts interlocked to hold the contents of the carton in a closed and sealed condition. It is understood that while the invention is described as being used with ice cream that other products might be used if desired, and it is to be further pointed out that the means for measuring and filling the cartons may be employed with other machinery and with other products than those here shown.

In the drawings, 11 indicates a base structure. This structure is defined by a housing having opposite end walls 12 and 13, opposite side walls 14 and 15, a floor 16, and a top 17. For convenience, the top is substantially at table height. Disposed above the top is a plurality of carton blank magazine units 18, adjacent to which are carton folding and forming units 19. There are also mounted above the top 17 a plurality of product measuring and dispensing units 20 and a plurality of carton closing units 21. The carton magazine units 18 and the carton closing units 21 are disposed in the path of travel of a conveyor chain 22 and along the straight run 22a thereof. The folding and forming units 19 and the measuring and dispensing units 20 are disposed along the other parallel straight run of the conveyor chain 22, as indicated at 22b. The conveyor chain 22 is led around sprocket wheels 23 and 24 adjacent to the opposite ends of the base structure 11. These sprockets lie in a horizontal plane parallel to the top 17 of the base. The sprocket 23 is an idler sprocket mounted upon a vertical shaft 25. The sprocket 24 is a driven sprocket mounted upon a vertical drive shaft 26. The shaft 26 is supported in bearings 27 and 28 and is driven intermittently through a mechanism to be hereinafter described.

A power unit for driving the shaft 26 and the other parts of the machine comprises an electric motor 29 mounted within the base structure upon a platform 30. The motor shaft 31 carries pulleys 32 and 33. The pulley 32 receives a belt 34 which is led around a pulley 35 of a compressor 36. The pulley 33 receives a belt 37 which leads around a pulley 38 mounted upon a horizontally disposed jack shaft 39. This shaft is mounted in bearings 40 resting upon the floor 16 of the base structure at approximately the center thereof. The jack shaft also carries a pulley 41 receiving a belt 42. The belt 42 leads around a pulley 43 mounted upon a jack shaft 44. The jack shaft 44 is suitably supported in bearings 45 carried by a gear box 46. The gear box 46 is also fitted with bearings 47 through which a vertical shaft 48 extends and by which it is rotatably supported. Mounted upon the shaft 48 is a worm wheel 49 in mesh with a worm gear 50 which is carried upon the jack shaft 44. The vertical shaft 48 is rotatably supported at its opposite ends by bearings carried by the floor and top sections of the base. Mounted upon the shaft 48 at a point beneath the gear box 46 is a disc 51 carrying a pin 51'. The pin 51' is adapted to engage the slots of a Geneva cam 52 which is mounted upon a cam shaft 53. The shaft 53 also carries a relatively large driving gear 231 which is in mesh with a gear 230 mounted upon a vertical shaft 230'. The shaft 230′ is mounted in a bearing secured to the floor 16. A vertical shaft 56 is rotatably mounted in a bearing carried by the bottom wall 16 of the housing. A gear 55 is freely mounted on the shaft 56 and is driven by a gear 54 mounted upon shaft 48. Pivoted to the gear 55 is a rack bar 58 which is secured to a pivot pin 59. The rack bar extends horizontally and is held in mesh with a pinion 60 which is freely rotatable upon the drive shaft 26. This pinion is fixed to a disc 61 on the drive shaft 26. At a point in the margin of the disc 61 is a notch having a square shoulder 62. Disposed directly beneath the disc 61 is a disc 63. This disc is keyed to the drive shaft 26 and carries a pawl 64 which may fall into the notch and encounter the shoulder 62. A spring 65 urges the pawl 64 inwardly so that it will bear against the periphery of the disc 61. A notch 66 is formed in the circumferential edge of the disc 63 and is engaged by a pin 67. The pin 67 is carried at one free end of a bell crank 68. This bell crank is pivoted upon a vertical pivot shaft 69 carried in a suitable bearing on the floor of the base. The other arm of the bell crank 68 extends horizontally and terminates in an arcuate portion 70 which occurs beneath the gear 55. The radius of this arc is struck from the center of the shaft 56 and when the gear 55 rotates in a clockwise direction a pin 71 thereon will engage the arcuate portion 70 of the bell crank 68 and withdraw the lock pin 67 from the groove 66 in the edge of the disc 63. A spring 72 is fastened to the bell crank and tends to urge the pin 67 against the periphery of the disc 63. A shackle structure 73 embraces the rack 58 and is pivoted upon the shaft 26 so that as the rack reciprocates and oscillates it will be maintained in constant mesh with the pinion 60. By this arrangement the conveyor chain 22 will be driven a predetermined distance at each driving impulse and will be locked against movement in the pause therebetween.

Extending upwardly from the chain 22 at equal spaced intervals along the length thereof are screws 74. These screws receive individual molds or pockets 75 within which cartons made from the blanks 10 are to be placed and filled. The members 75 are substantially U-shaped and have a bottom wall 76 and parallel vertical walls 77. The vertical walls extend in planes normal to the longitudinal center of the sprocket chain 22. The sides of the molds 75 are open.

Figure 1:
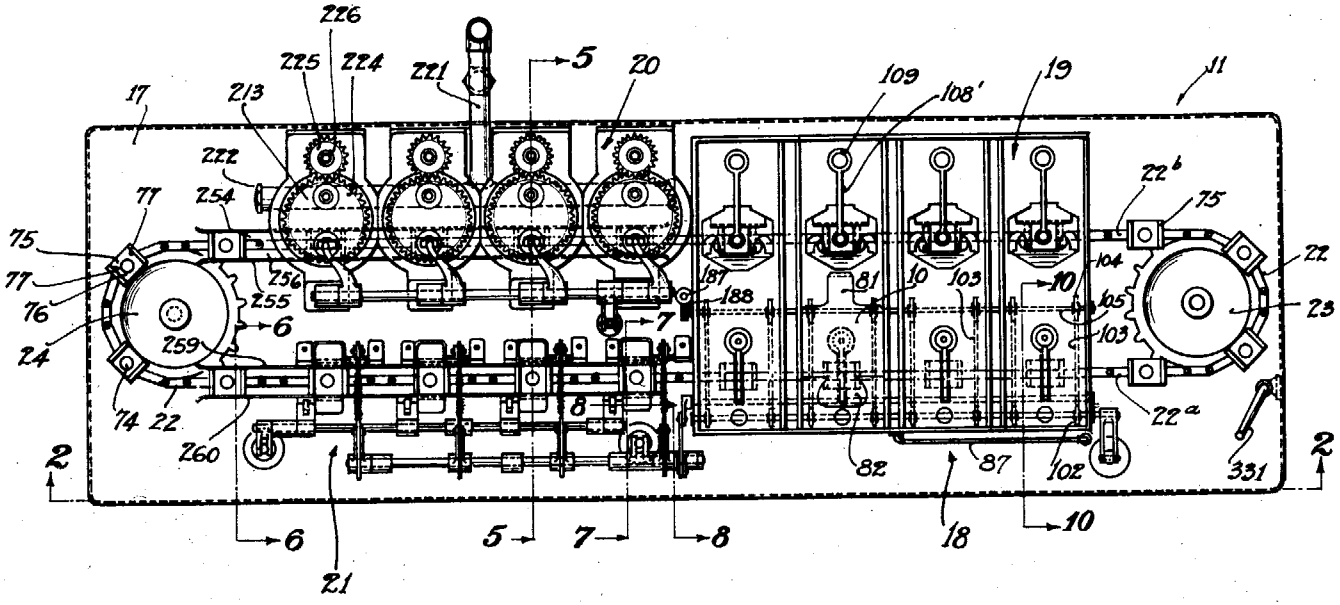
Figure 1 is a view in plan showing the complete machine as designed to form, fill and discharge four containers in one unit of operation.
Figure 2:
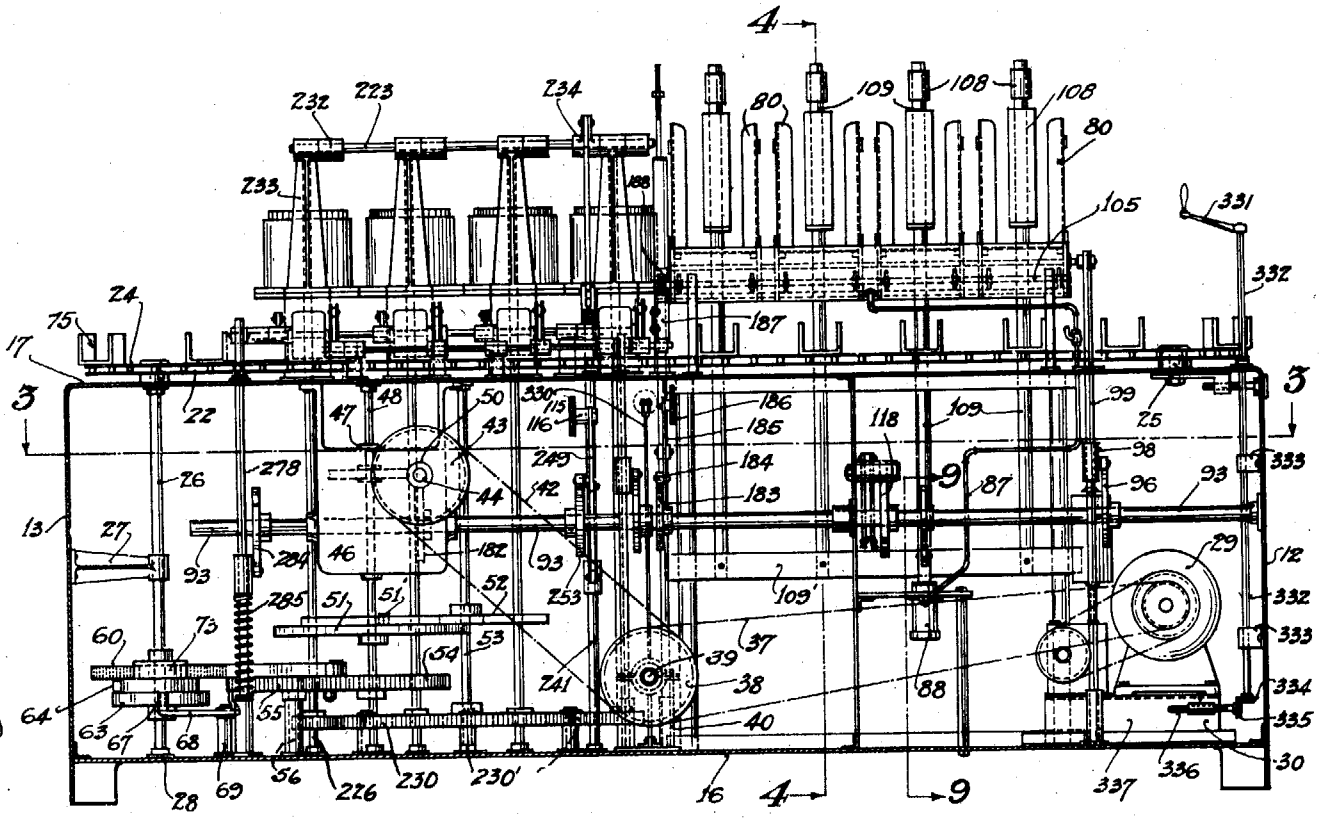
Fig. 2 is a view in vertical section and elevation as seen on the line 2—2 of Fig. 1 and shows the driving mechanism for the structure.
Figure 4:
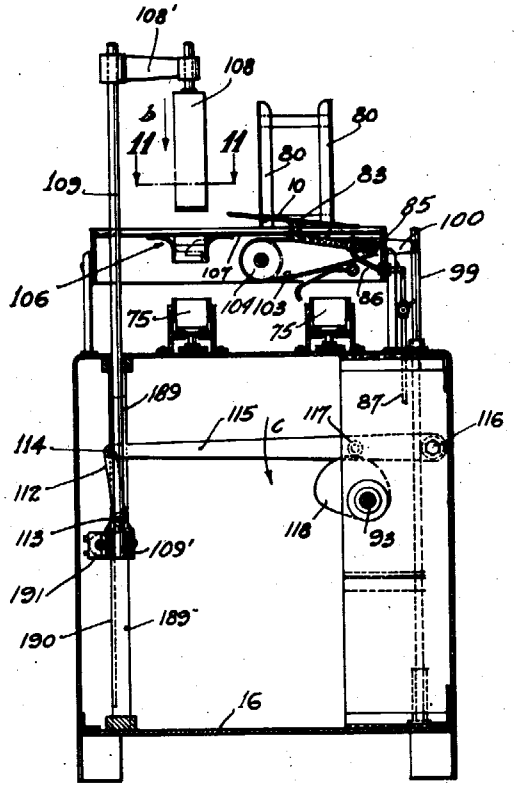
Fig. 4 is a view in transverse section through the machine as seen on the line 4—4 of Fig. 2 and illustrates the carton blank feeding mechanism and the means for engaging said blank, folding the same, and placing it within a mold.
Figures 6, 7, 8, 9:
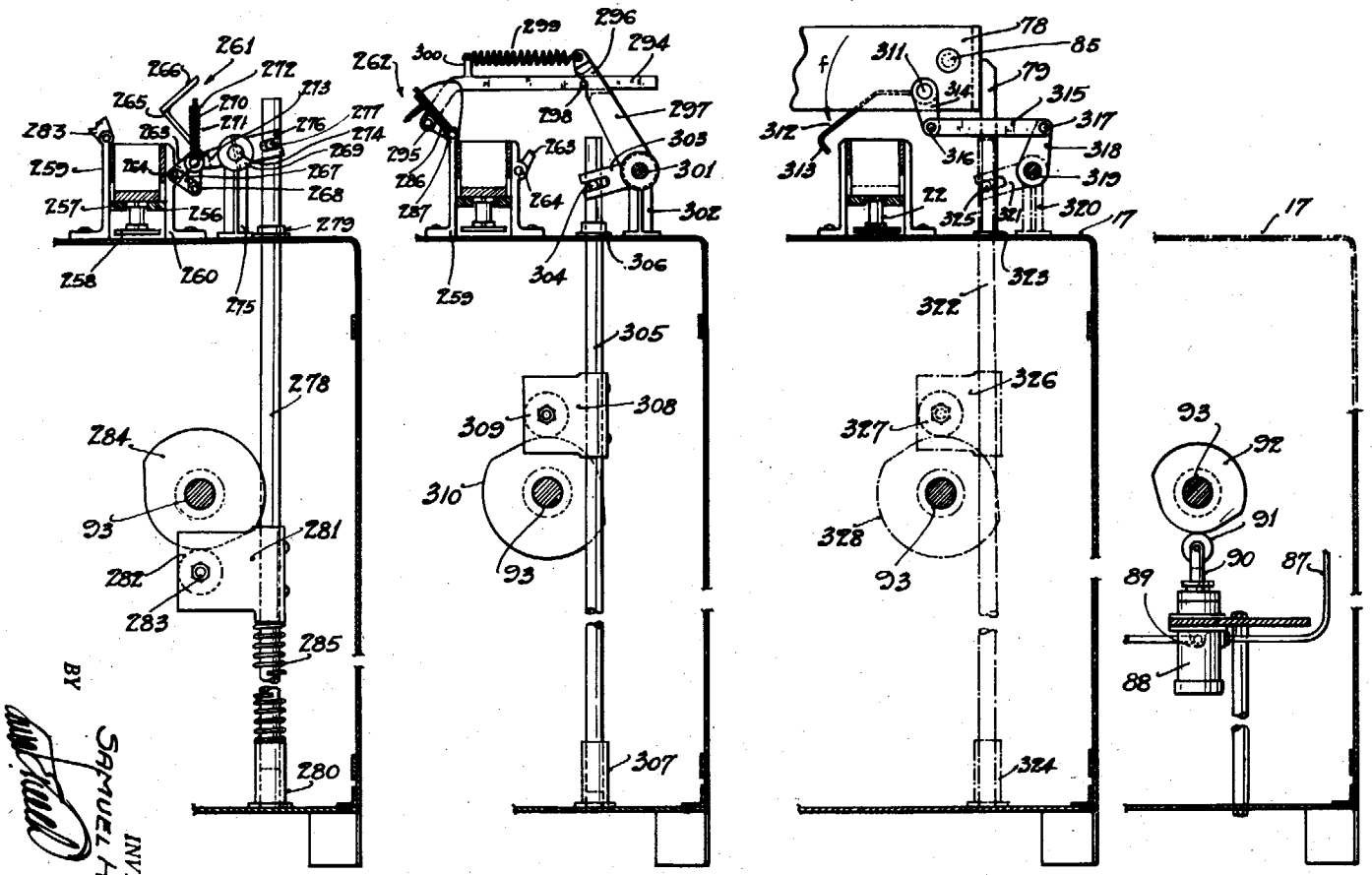
Fig. 6 is a fragmentary view in section and elevation as seen on the line 6—6 of Fig. 1 and shows the carton closing device in its discharge position.
Fig. 7 is a view in vertical section and elevation as seen on the line 7—7 of Fig. 1 and shows the closing device in its open position.
Fig. 8 is a view in vertical section and elevation as seen on the line 8—8 of Fig. 1 and shows the package discharge mechanism.
Fig. 9 is a view in vertical section and elevation as seen on the line 9—9 of Fig. 2 and shows the operating mechanism associated with the forming plunger.
Figure 10:
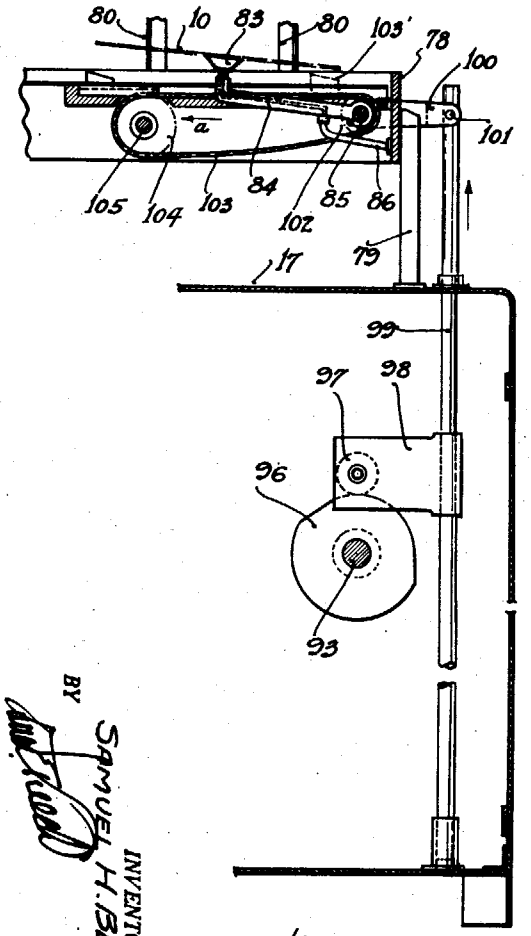
Fig. 10 is a view in vertical section and elevation as seen on the line 10—10 of Fig. 1 and shows the feed mechanism for withdrawing a carton blank from the bottom of the magazine and carrying it forwardly to the folding station.

The first operation of the machine is to withdraw carton blanks from the magazine units 18 and to fold and shape these blanks in the units 19. It will be seen from an examination of Fig. 1 that this particular machine has been designed to form and fill four cartons simultaneously while the machine operates intermittently to successively prepare and fill groups of four cartons. Thus, when one of the complete units is described it is to be understood that the reference numerals apply equally to all of the units of the same kind. The magazine units, as illustrated in Fig. 10 of the drawing, comprise a frame 78 which is supported in a horizontal plane above the top 17 of the base structure by uprights 79. Extending upwardly from the uprights are pockets 80 which form a magazine into which the blanks 10 are positioned. By reference to Fig. 1 it will be seen that the central rectangular portion of the blank is disposed between the pockets 80, that an inner sealing flap 81 thereof projects horizontally and toward the folding units, and that an outer cover flap 82 projects in the opposite direction. The blanks are temporarily held so that they will be consecutively drawn from the bottom of the magazine and transferred horizontally to the folding and forming units 19. As shown in Fig. 10 this is accomplished by a suction cup 83 which is carried upon an oscillating tubular arm 84. The arm is mounted upon a horizontal shaft 85 and will rock therewith. A passageway within the arm communicates with the cup and also communicates with a suction pipe 86. The suction pipe 86 leads to a distributing pipe 87 which extends downwardly to connect to a suction pump 88. By reference to Fig. 9 of the drawing it will be seen that the suction pump is provided with a plunger 89 secured to a plunger rod 90. The rod 90 extends vertically and carries a roller 91 at its upper end. The roller 91 is engaged by the periphery of a cam 92 mounted upon a horizontal power shaft 93. The power shaft 93 is rotatably supported in bearings 94 and 95. This shaft also carries a cam 96 which engages a cam roller 97. The cam roller is supported upon a cam arm 98. This arm is rigidly secured to a vertically moving lift rod 99. The upper end of this lift rod is pivotally connected to a lever arm 100 by a pin 101. The arm 100 is fixed to the shaft 85. This shaft carries the set of tubular arms 84 previously described, and when the lift rod 99 moves upwardly, as indicated by the arrow, the tubular member 84 with the vacuum cup 83 will swing downwardly. Mounted upon the shaft 85 for free rotation are sprockets 102. Two of these sprockets are provided for each of the magazine units and are spaced from each other as shown in Fig. 1 to receive feed chains 103. These feed chains are led around sprockets 104 mounted upon a shaft 105. The shaft 105 extends through the frame structure 78 and is rotatably supported thereby. The feed chains 103 are disposed beneath the magazine stacks and receive the carton blank 10 to move it horizontally and to position it properly with relation to a folding die 106. By reference to Fig. 4 of the drawing it will be seen that a horizontal floor 107 extends over the upper run of the chains 103 and across and above the folding die. The details of the folding die will be described hereinafter. In Fig. 4, however, it will be seen that a plunger 108 is mounted upon an arm 108′ and is carried by a lift rod 109. This rod reciprocates vertically. The lower ends of the lift rods 109 are secured within a lift bar 109′. Shackles 112 are connected with the lift bar 109′ by a pivot 113. The upper ends of the shackles 112 are provided with pivot pins 114 which connect the shackles with the free end of an oscillating arm 115. This arm extends horizontally across and within the base structure and is pivotally mounted upon a pivot shaft 116. The arm carries a cam roller 117 which rests continuously upon the edge face of a cam 118. This cam is fixed upon the shaft 93 and is thus driven in synchronism with other cams which are mounted upon the timing shaft 93.

Figure 28:
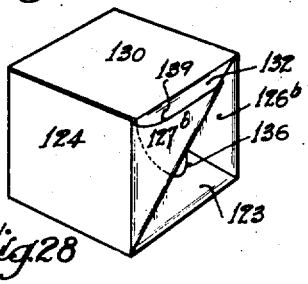
Fig. 28 is a view showing the completed carton.

In order to describe the folding action by which the blank 10 is folded to form the carton to be filled the construction of the blank should be described. By reference to Fig. 14 it will be seen that the blank is scored so that it has a center field 120. This field provides the bottom of the carton. At the opposite sides of the scored field are side panels 121, 122, 123 and 124. In the final blank these panels are folded at right angles to the field 120 to provide solid side walls for a container. Intermediate the panels 121 and 122 is a gusset panel comprising triangular portions 125–a and 125–b. The field including these portions is of the same size as the side panels. Intermediate the side panels 122 and 123 is a gusset panel comprising triangular portions 126–a and 126–b. These are here shown as agreeing in size with the side panels. Intermediate the panels 123 and 124 is a gusset field comprising portions 127–a and 127–b, and intermediate the side panels 121 and 124 is a gusset panel comprising portions 128–a and 128–b. The panel portions 127–a and 128–a are substantially the same size as the triangular portions 125–a and 126–a. The panels 127–b and 128–b are cut away along their outer edges to provide clearance, as will be hereinafter explained. The panel 124 has an inner cover panel 129 hinged at its outer edge. This panel agrees substantially in dimension with the panel 120 and has a flap 129′ at its free end which is folded to provide means by which the panel 129 may be pulled from over the top of the contents of the container. At the outer edge of the panel 122 is a field 130 which agrees in dimensions with the field 129 and provides the top cover for the container. At opposite sides of this field are sealing flaps 131 and 132. These are substantially triangular although they have outer curved ends 133 and 134 which terminate in lock tangs 135 and 136. When the container is closed the lock tangs are inserted into lock slots 137 and 138 which lie on the diagonal lines dividing the gusset portions 127–a and 127–b and 128–a and 128–b, as indicated in Fig. 28 of the drawing. The folding and forming units 19 act to fold the blank 10 so that the side panels 121, 122, 123 and 124 are disposed at right angles to the bottom panel 120 and at right angles to each other. This will cause the gusset panels to occur at the contiguous edges of the side panels and it is desired to fold the triangular portions of the gussets along their diagonal score lines and on the outsides of the side panels 121 and 123. It is also intended to fold the gusset panels so that the triangular gusset portions 126–a and 126–b lie directly against the panels 121 and 123, respectively, with the gusset portions 127–a and 128–a overlapping and lying against the gusset portions 125–b and 126–b. This will provide an outside pocket between the panel portions 128–a and 128–b on one side of the container and between the panel portions 127–a and 127–b upon the opposite side of the container. Due to the fact that the outer edges of the portions 127–b and 128–b are shorter, as indicated at 139 in Fig. 28, it will be possible to easily insert the flaps 131 and 132 into the pockets and to introduce the locking tangs 137 and 138.

Figure 12:
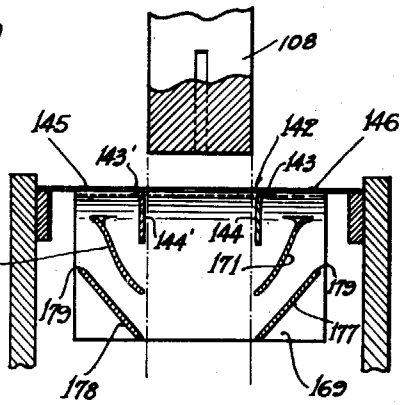
Fig. 12 is a view in transverse vertical section through the folding die as seen on the line 12—12 of Fig. 11.
Figure 11:
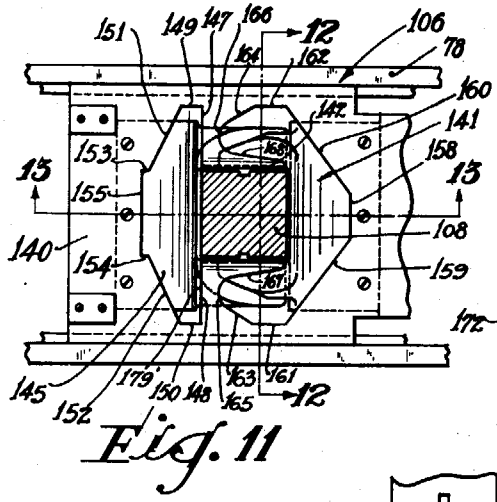
Fig. 11 is an enlarged view in horizontal section and elevation as seen on the line 11—11 of Fig. 4 and shows the forming plunger and the folding die therebeneath.
Figure 13:
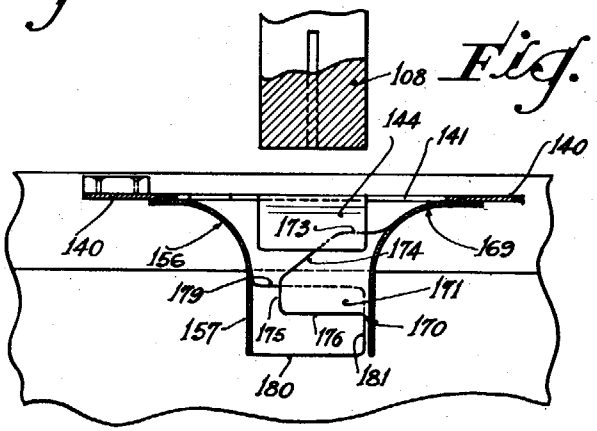
Fig. 13 is a view in transverse section as seen on the line 13—13 of Fig. 11 and at right angles to Fig. 12 showing other details of the folding die.

The folding and forming operations are performed by the units 19. These units, as generally indicated in Fig. 4, comprise a folding die 106 and a forming plunger 108. The plunger reciprocates through the die and deposits a folded carton blank 10 into a mold 75 which is therebeneath and in vertical register therewith. The plunger agrees in horizontal cross-section with the shape and dimensions of the field 120 of the blank. The folding die is illustrated in Figs. 11–22, inclusive. Here it will be seen that the frame 78 supports a plate 140 which is in the plane of the floor 107. This plate, as shown in Figs. 11 and 13 of the drawing, is formed with a central opening 141 through it. This opening has a central portion agreeing substantially with the width of the carton as indicated at 142. This portion has upper and outwardly extending curved edges 143 and downwardly extending parallel lengths 144 along one side, and similar portions 143′ and 144′ on the other side. These provide an initial throat through which the blank is carried by the plunger. The throat engages the side panels 121 and 123 of the blank to fold them upwardly. The portions 143 and 144 are of a horizontal length agreeing substantially with the width of the panels 121 and 123 of the blank. At the opposite sides of the portions 144 and 144′ are cutaway openings 145 and 146. The opening 146 is defined by straight edges 147 and 148 which are in the same plane and lie along substantially the plane of the panel 124 of the carton when it is folded. The edge portions 147 extend laterally from the opening 141 which occurs between the members 144 and 144′. The length of these edges is sufficient to accommodate the partially folded gusset portions 127–a and 127–b on one side and 128–a and 128–b on the opposite side. The ends of the opening 145 terminate in edges 149 and 150 which are parallel and at right angles to edges 147 and 148. Connecting with these edges are obliquely disposed edges 151 and 152 which extend inwardly and connect with short parallel faces 153 and 154 spaced from each other a distance substantially agreeing with and accommodating the width of the field 129. The edges 153 and 154 are connected by a straight edge 155.

As shown in Fig. 13 of the drawing a curved plate 156 extends inwardly and downwardly beneath the plate 140 from a point contiguous to the edge 155 of the opening 145. This plate has a curved portion terminating in a downwardly extending vertical wall 157. The opening 146 in the plate 140 is designed to accommodate the wall panel 122 and the gusset panels 125–a and 125–b on one side and the panel portions 126–a and 126–b on the opposite side. Since these gussets must be folded over and against the sides 121 and 123 of the carton before the other gussets are folded the opening 146 is formed to accommodate the gussets as they swing. Referring to Fig. 11 it will be seen that the opening 146 is defined by an edge 158 which is parallel to the side face of the plunger 108 designed to engage the panel 122 of the carton blank. Extending oppositely from the edge 158 are oblique edges 159 and 160 which terminate in edges 161 and 162, respectively. These edges are in the same plane with the edges 149 and 150 of the opening 145. The edges 161 and 162 extend substantially to the median line of the opening 142 where they continue in inwardly inclined edges 163 and 164. Curved edges 165 and 166 form continuations of these edges, after which the opening is completed by oblique edges 167 and 168. It will thus be seen that the opening 146 may be generally considered as U-shaped and extending along one side of the path of the plunger 108 and partially around the two continguous sides thereof. These portions accommodate the gusset fields occurring at each side of the side wall 122 and allow these fields to fold and swing inwardly against the sides 121 and 123 of the container blank. Mounted beneath the opening 142 is a plate 169 which curves downwardly and inwardly and terminates in a portion 170 which lies in a vertical plane parallel to that of the vertical portion 157 of the plate 156. The plate 169 carries a pair of folding blades 171 and 172. These blades are shown in Fig. 12 of the drawing as being inclined downwardly and inwardly to terminate in vertical planes substantially agreeing with the vertical planes within which the inner faces of the members 144 and 144' lie. By reference to Fig. 13 of the drawing it will be seen that the members 171 and 172 extend horizontally from the inner face of the member 169 and that they are defined by an upper horizontal edge 173 which emanates from the convexed surface of the plate 169 and overlaps the members 144 and 144' for a distance representing approximately one-fourth of the width of these members. The edge 173 continues in an oblique edge 174 which extends downwardly and across the center line of the path of travel of the plunger 108 to a point below the lower horizontal edges of the members 144 and 144' and approximately three-fourths of the width of these members. A vertical edge 175 continues from the lower end of edge 174 to intersect the plane of a horizontal edge 176. This edge extends to the vertical portion 170 of the plate 169. By the combined action of the plate 169 and the gusset folding members 171 and 172 the field 122 of the carton blank is forced inwardly to a vertical position and the tangs adjoining this field are folded together as they move down the members 171 and 172 and along the inclined edges 174.

The folding of the gusset fields adjoining the field 124 of the carton blank is accomplished by the plate 156 and a pair of folding elements 177 and 178. These elements are obliquely disposed as shown in Fig. 12 of the drawing and are spaced at opposite sides of the path of travel of the plunger 108. The elements are substantially rectangular in shape and extend from the portion 157 of the plate 156. Their upper edges are horizontal, as indicated at 179 in Fig. 13 of the drawing. This edge is in a horizontal plane between the horizontal planes of the lower edges of members 144 and 144' and the lower edges 176 of the members 171 and 172. The members 177 and 178 have a lower horizontal edge 180 parallel to the edge 179 and lying in a plane below the plane of the lower edges 176 of the members 171 and 172. The opposite ends of the members from their point of connection upon the portion 157 are free and extend vertically, as indicated at 181. These edges stand in relatively close proximity to the inner face of the portion 170 of the plate 169 and thus fold the gusset portions 127–a and 127–b against the sides of the carton at one side and the gusset portions 128–a and 128–b against the sides of the carton at the opposite side. The plunger 108 is designed to have a stroke which will cause it to move entirely down through the folding and forming die 106 and into the molds 75 carried by the sprocket chain 22, from which point the sprocket chain carried the formed containers to the filling units 20.

As previously explained, the plungers 108 are caused to reciprocate through the action of cam 118 on the timing shaft 93. This timing shaft extends longitudinally of the machine and through the gear box 45 where it is journaled. Within the gear box a worm gear wheel 182 is mounted upon the shaft 93 and is in mesh with the worm gear 50 by which continuous rotation of the shaft 93 is produced.

It will be seen that the shaft 93 provides a timing drive for all of the cams, and that the conveyor chains for feeding the blanks 10 are given an alternate drive motion through a cam 183 which is mounted upon the shaft 93. This cam receives a roller 184 mounted upon the free end of a cam lever 185 which is pivoted to a cross frame member 186. Connected to the lever 185 is a gear rack 187. This rack reciprocates vertically and engages a pinion 188 which is fixed on the end of the sprocket chain shaft 105. This will insure that the shaft 105 will be alternately rotated to drive the upper run of the chain 103 back and forth so that a lug 103' may engage the rear edge of the lowermost blank 10 withdrawn from a magazine and carry it horizontally in a position over the folding dies.

Figure 3:
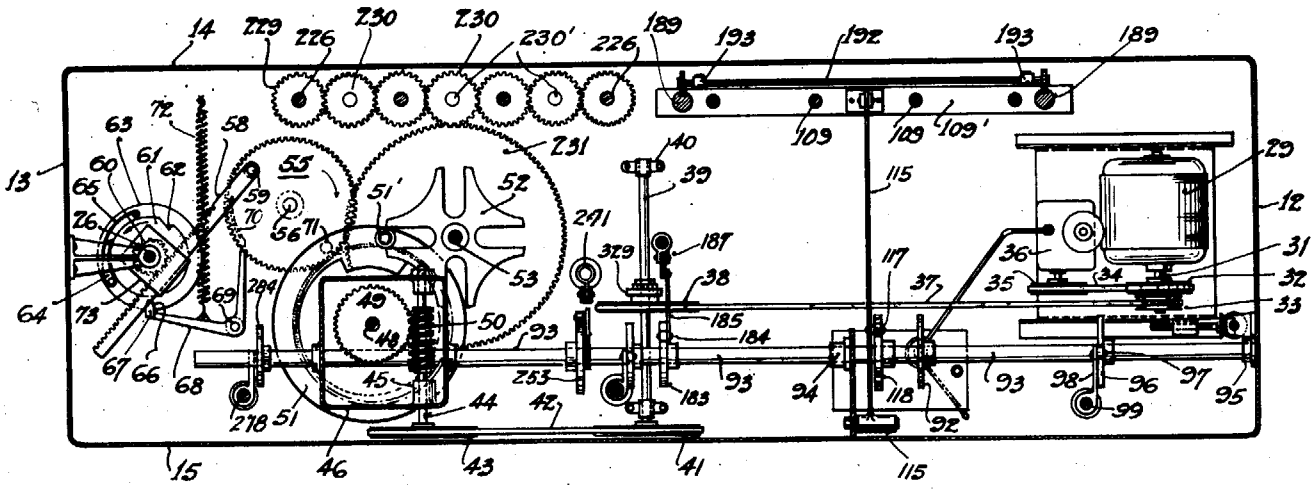
Fig. 3 is a view in horizontal section and elevation as seen on the line 3—3 of Fig. 2 and shows other details of the driving mechanism.

The plungers 108 which cooperate with the folding dies 106 are supported on individual standards 109 which are carried by a crosshead 109' as shown in Fig. 3. The opposite ends of the crosshead are reciprocably mounted upon cylindrical posts 189 which are secured to the floor 16 of the base portion of the machine. Each of the posts 189 have a gear rack 190 cut longitudinally of one face. Each of the racks 190 receives a gear pinion 191. As shown in Fig. 3 of the drawings, these pinions are mounted upon the opposite ends of a shaft 192 rotatably supported from the member 109' by bearings 193. By this arrangement the crosshead 109' which is lifted from its center by the lever arm 115 will be caused to move vertically while maintained in a horizontally aligned position. This will prevent the crosshead from binding on either one of the posts 189.

Figure 19:
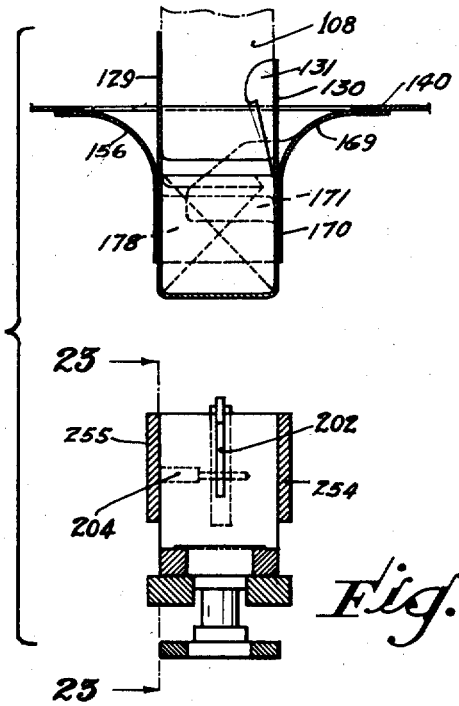
Fig. 19 is an enlarged view in vertical section and elevation as seen on the line 19—19 of Fig. 1 and shows the relative position of the folding die, the carton mold, and a folded carton which passes through the folding die and into the mold.
Figure 20:
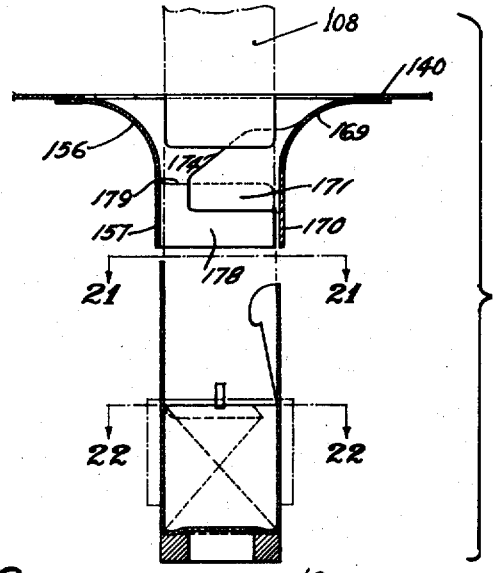
Fig. 20 is a view showing the structure of Fig. 19 and indicates the carton within the mold with the forming plunger partially retracted.
Figure 21:
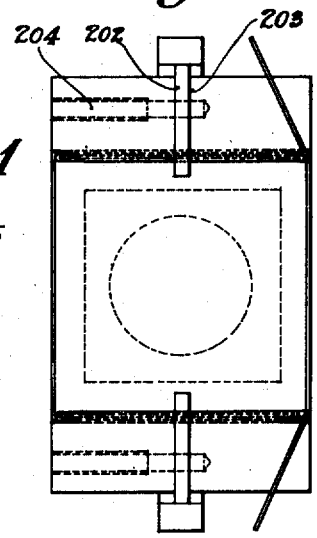
Fig. 21 is an enlarged view in horizontal section and elevation as seen on the line 21—21 of Fig. 20 and shows the carton within the mold preparatory to filling and with the edge gripping members in place.
Figure 22:
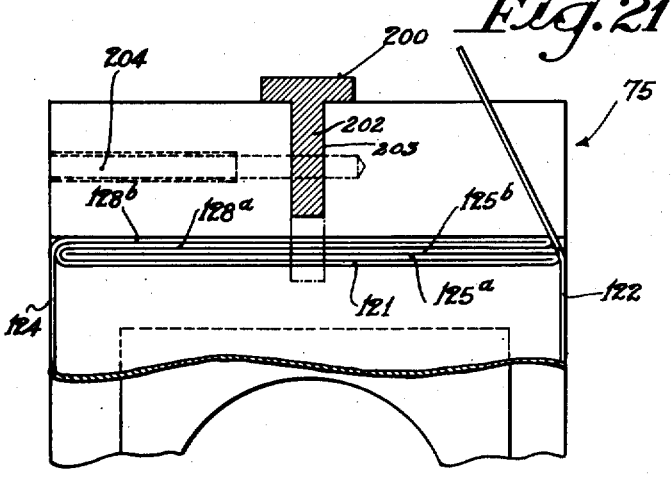
Fig. 22 is an enlarged view in horizontal section and elevation showing one of the folded edges of the carton within the mold and indicating the manner in which the carton is folded.
Figure 23:
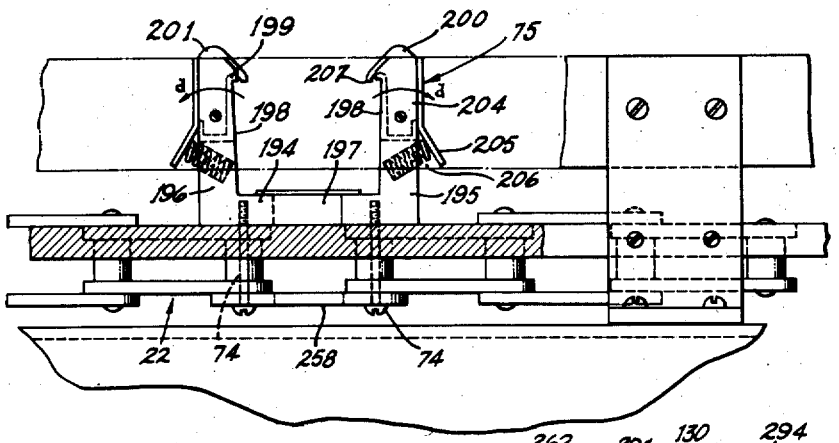
Fig. 23 is an enlarged view in vertical section and elevation as seen on the line 23—23 of Fig. 19 and shows the construction and operation of the carton gripping fingers.
Figure 24:
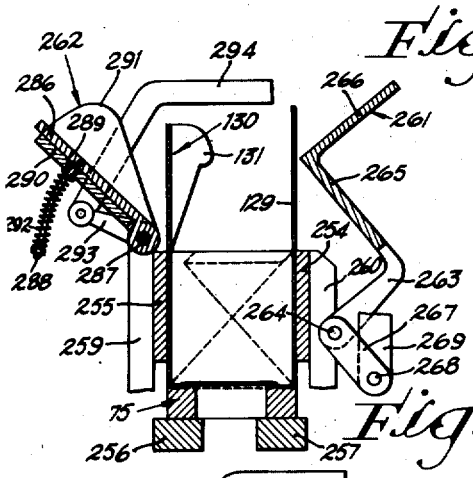
Fig. 24 is an enlarged view in vertical section and elevation showing the closing mechanism indicated in Fig. 7.

It will be obvious that when the plungers 108 are retracted from the containers which have been deposited in the molds 75 there will be a tendency for the gussets to spread and thus to force the fields 121 and 123 of the blank inwardly. It is necessary to hold the gussets and the adjoining walls in a firmly folded condition so that they will not interfere with a subsequent filling operation. By reference to Figs. 19, 21, 22 and 23 it will be seen that means are provided to hold the folded gussets. In Fig. 23 the molds 75 are shown in detail. Here it will be seen that they comprise a U-shaped structure having a bottom wall 194 and substantially parallel side walls 195 and 196. The dimensions of the bottom wall 194 occurring between the side walls agree substantially with the dimensions of the bottom field 120 of the carton. A central opening 197 is formed through the bottom wall so that the carton can be removed if it becomes fastened between the side walls. The side walls each have an inner face 198 which flares upwardly and slightly outwardly and terminates in an overhanging shoulder 199 beneath which the folded gussets and the contiguous side walls may pass, since the shoulder is of a height to accommodate them. Mounted in the side walls 195 and 196 are finger structures 200 and 201. These structures, as shown in Figs. 19 and 21, have a central relatively narrow portion 202 which fits within a slit 203 in the side walls of the molds. A transverse bore in the side wall of the mold accommodates a threaded pivot pin 204. As shown in Fig. 22 of the drawing the section of the fingers 200 and 201 is T-shaped so that the enlarged outer portion will abut against the outer faces of the side walls 195 and 196 and limit the inward swinging movement. At the lower ends of the finger structures outwardly flaring extensions 205 occur. Compression springs 206 bear against these extensions and tend to swing the fingers 200 and 201 inwardly. The upper ends of the fingers are formed with hook-shaped tips 207 which swing to a position in a plane lower than the plane of the shoulders 199 on the side walls. Thus they will hook over the folds of the gussets and the contiguous side wall and hold these members in a tightly compressed condition as the molds 75 travel to the measuring and dispensing units 20.

Figure 5:
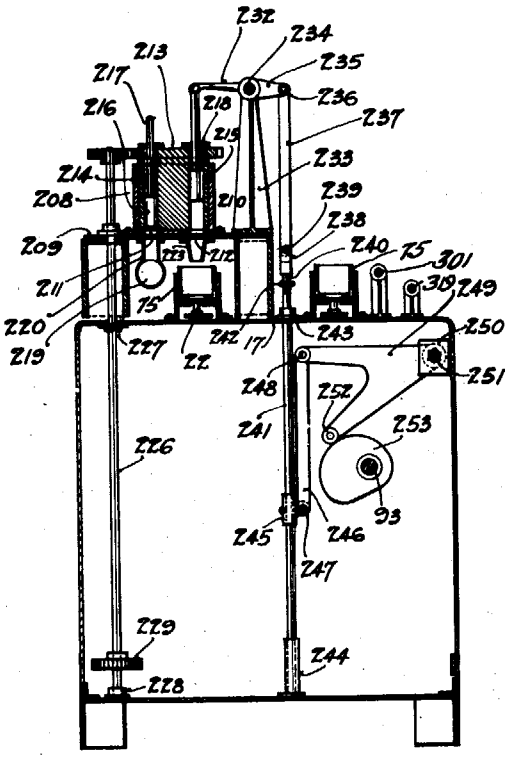
Fig. 5 is a view in transverse section through the machine as seen on the line 5—5 of Fig. 1 and shows the ice cream measuring and dispensing device.

The measuring and dispensing units 20 involve novel means for measuring quantities of semi-solid material and for discharging it in predetermined measured quantities to a container. The structure is simple and may be made easily from stainless steel so that the parts may be quickly removed, separated and sterilized when required. Each of the measuring units comprises an outer cylindrical shell 208. This shell is secured to a horizontal floor plate 209 which is disposed above the path of travel of the conveyor chain 22 and is parallel to the top wall 17 of the base structure. The shell 208 is formed with a bottom wall 210. Valve ports 211 and 212 are formed through the bottom wall 210 and the plate 209. These ports are spaced equally from the center of the shell upon diametrically opposite sides thereof and with their central axes in the same plane as the vertical center of the shell. This plane is normal to the path of travel of the conveyor chain 22. The center line of the valve port 212 is in vertical alignment with the center of the run of conveyor chain which passes beneath the plate 209. The upper end of the cylindrical shell 208 is open and receives a measuring valve 213. This valve is formed with a plurality of measuring cylinders 214 and 215. The measuring cylinders extend parallel to each other and to the central axis of the cylindrical shell 208 and are designed to register with the valve ports 211 and 212. Mounted to reciprocate in each of the cylinders 214 and 215 are pistons 216, each of which carry a plunger rod 217 at its upper end. These plunger rods each extend through a packing gland 218. The lower ends of the cylinders 214 and 215 are of the same diameter as the ports 211 and 212. Thus when the lower opened ends of the cylinders register with the valve ports 211 and 212 a clear and unobstructed passageway will be formed. Secured beneath the valve port 211 is a manifold conduit 219 which extends horizontally and is formed with a plurality of lateral connections 220, one of which is in direct communication with each of the valve ports 211. As shown in Fig. 5 of the drawing the conduit 219 is of larger cross-section than the connections 220. A feed pipe 221 connects with the manifold, as shown in Fig. 1 of the drawing, and this in turn leads to a source of ice cream supply from which ice cream is delivered under pressure in a semi-fluid state to the machine. The opposite ends of the manifold are provided with removable plugs 222 which permit free access to the manifold so that the interior thereof may be cleaned and scalded when desired. Disposed beneath the valve port 212 is a nozzle 223. This nozzle has a discharge end of reduced diameter so that the ice cream forced from a measuring cylinder will be discharged into a carton disposed therebeneath. Mounted upon the upper end of each of the measuring valves 213 is a gear 224. This gear extends around the perimeter of the portion of the valve which projects above the cylindrical shell 208. Each of the gears 224 is in mesh with a pinion 225. The pinions are mounted upon a series of vertical shafts 226. These shafts extend downwardly into the base structure of the machine and are rotatably supported by bearings 227 and 228. Secured upon each of the shafts 226 at a point within the base structure is a pinion 229. These pinions, as shown in Fig. 3 of the drawing, are spaced an equal distance apart so that intermediate pinions 230 may be in mesh with the pinions 229 on each side thereof. This provides a gear train which will cause all of the pinions 229 to rotate in the same direction when driven from one of the gears. As shown in Fig. 3 of the drawing, the intermediate pinion 230 is in mesh with a large driving gear 231. This gear is carried on shaft 53 upon which the Geneva gear 52 has previously been described as being rotated. The gear ratio is such as to insure that at each movement of the Geneva gear 52 the gear train, comprising gears 229 and 230, will rotate one-half a revolution. This in turn will alternately dispose the measuring cylinders 214 and 215 into register with the valve port 212 and the discharge nozzle 223 while the other cylinder will be in register with the manifold conduit 219.

In order to eject ice cream from the cylinder 214 or 215 which is in register with the valve port 212 a rocker arm 232 is provided for each of the dispensing units. These rocker arms are mounted upon standards 233. The standards 233 are secured to the base and extend upwardly therefrom to carry a rocker arm shaft 234. In Fig. 5 of the drawing it will be seen that an actuating arm 235 is fixed on the shaft 234 and is pivotally connected at 236 with a pitman rod 237. The lower end of this rod is connected to a fitting 238 by a pivot pin 239. This fitting has a threaded bore in its lower end to receive the upper threaded end 240 of a lift rod 241. The lift rod is provided with an adjusting nut 242 which makes it possible to vary the effective length of the lift rod and to thus control the length of travel of the pistons 216. The lift rod 241 is reciprocably mounted in bearings 243 and 244 so that the rod may move vertically. A fitting 245 is secured upon the lift rod 241 and is connected to a link 246 by a pivot 247. The upper end of the link 246 is provided with a pivot pin 248 which connects with one arm of a bell crank 249. The bell crank is mounted on brackets 250 within the base structure upon a pivot shaft 251. The opposite arm of the bell crank extends downwardly and carries a cam roller 252 which rests against the surface contour of a cam 253. This cam is fixed on the timing shaft 93.

It is to be pointed out that the run of conveyor chain which passes beneath the discharge spouts 123 are led between a pair of spaced side rails 254 and 255. These temporarily close the opposite sides of the molds 75 and in effect provide a rectangular container within which the carton is confined while traveling beneath the filling units 20. The conveyor chain 22 passes along a pair of spaced guide rails 256 and 257. A portion of the chain and brace plates 258 travel along a path beneath said guide rails.

After the cartons have been filled they are carried by the conveyor chain to the closing units 21. These units are disposed along the return run of the chain 22. The closing units are distributed in spaced relation along a pair of guide plates 259 and 260 between which the molds 75 are drawn. At each of the closing unit stations there is a folding member 261 and a final closing mechanism 262. The folding member and its operating means are indicated in Fig. 6 of the drawing as [dissociated] *disassociated* from the closing mechanism. The closing mechanism is indicated in Fig. 7 of the drawing with the folding member removed for the sake of clarity. As shown in Fig. 6 of the drawing the folding member comprises a lever arm 263 pivotally mounted upon a pin 264 carried by the guide plate 260.

Disposed at right angles to the arm 263 is a plate 265 which is so positioned as to assume a horizontal position directly over the top of a carton within a mold 75. This member therefore folds the field 129 downwardly over the contents of the carton and allows the end tang 129' to fold upwardly at right angles thereto. Formed at the end of the plate 265 is a plate 266 which engages and folds the tang 129' and agrees in dimensions with the top field 130 of the blank. The folding members 261 are operated by a lever arm 267 which is fixed to the pivot shaft 264 and is designed to swing upwardly. At the outer end of each of the lever arms 267 is a pivot pin 268 which engages a yoke 269. The upper end of this yoke carries a rod 270 upon which a spring 271 is mounted and is held by a nut 272. The rod 270 extends through an opening in a lever arm 273. This arm is carried on a horizontal pivot shaft 274 mounted in standards 275. A forked portion 276 is formed on the opposite end of the lever 273 and receives pins 277. The pins 277 are carried upon an operating rod 278 which reciprocates vertically and is mounted within bearings 279 and 280 within the base structure. Secured upon the lift rod is an arm 281 carrying a cam roller 282 upon a shaft 283. The cam roller 282 is disposed beneath and engages the surface of a cam 284 which is mounted upon the timing shaft 93. A compression spring 285 is disposed between the bearing 280 and the arm 281 and acts to urge the operating rod 278 upwardly. The closing mechanism 262 comprises a swinging plate 286 mounted upon a pivot pin 287 at the upper edge of the guide plate 259. This plate carries an arcuate pin 288 which extends through an opening 289 in a plate 290 which carries side flap folding members 291. The plate 290 is mounted to pivot freely upon pivot shaft 287. A spring 292 is mounted upon the pin 288 and rests against the outer face of the plate 290 so that when the plate 286 swings toward an operative position it will draw the plate 290 and the side members 291 with it, allowing them however to [be urged yieldably by] *yield away from plate 286 thus compressing* the spring [288] *292*. The side flap folding members 291 are spaced a distance apart agreeing with the width of the carton so that the flap portions 131 and 132 of the blank will be folded in at right angles to the plane of the field 130. The plate 286 is fastened to the shaft 287. This shaft also carries a lever arm 293 which is fixed to the shaft 287 to produce rotation thereof. An overhead arm 294 is secured to the end of the lever 293 by a pivot pin 295. This arm is bent so that in its normal position the main body of the arm will extend horizontally above the container and provide suitable clearance. The arm 294 extends through a slotted opening 296 in an oscillating lever 297. A pin 298 on the arm 294 extends laterally from the arm and engages a face on the oscillating lever 297 whereby the arm is moved forwardly. A tension spring 299 engages the free end of the oscillating lever 297 at one end and engages a pin 300 on the arm 294 at its opposite end. This acts to hold the arm 294 and the lever 297 in yieldable engagement. The oscillating lever 297 is mounted upon a pivot shaft 301. The shaft 301 is carried on bearing brackets 302. This shaft also carries a forked arm 303 which engages lateral pins 304 in a lift shaft 305. The lift shaft 305 is mounted in bearings 306 and 307 and vertically reciprocates. An arm 308 is rigidly secured to the shaft 305 and carries a cam roller 309. This roller engages a cam 310 mounted upon the timing shaft 93.

Referring to Fig. 8 of the drawing, a mechanism is provided for ejecting the filled and closed cartons from the molds 75. The ejecting mechanism comprises a horizontal shaft 311 which is mounted in the frame structure 78 supported upon the top wall of the sub frame by the standards 79. It will be recognized that the frame 78 is the same frame which supports the magazine for the blanks 10 and the feed mechanism therefor. The shaft 311 carries a plurality of fingers 312, one of which registers with a mold 75 during the period when the molds stand stationary. These fingers have a horizontal portion which partially overhangs the molds and inclined ends which extend beyond the inner side of the molds. The inclined ends terminate in a hook 313. The fingers 312 are mounted to sweep across the molds between the side walls 26 and 27 and to dislodge the filled container from its seated position. The shaft 311 carries an operating lever 314 to which a link 315 is attached by a pivot pin 316. The opposite end of the link is provided with a pin 317 by which it is attached to a lever arm 318. The lever arm 318 is mounted upon the shaft 319 carried upon standards 320. The standards rest upon the top 17 of the base structure. Secured upon the shaft 319 is a forked arm 321 which straddles the lift bar 322. The lift bar 322 reciprocates vertically in bearings 323 and 324. Near the upper end of the bar are pivot pins 325 which engage the fork in the member 321. An arm 326 is fixed to the lift bar 322 and carries a cam roller 327 which rests upon the peripheral edge of a cam 328. The cam is mounted upon the timing shaft 93.

In order to interrupt the driving action from the motor 29 to the various driving shafts a clutch 329 is provided. This clutch is fitted with a shifting arm 330 which can be operated from the front of the machine.

In some instances the drive belt 37 may stretch so that it must be tightened. This is accomplished by rotating a hand crank 331 which is mounted upon a shaft 332. The shaft extends vertically within the base structure and is supported upon bearings 333. A bevel gear 334 is carried at the lower end of the shaft 332. This gear is in mesh with a gear 335 carried upon a threaded shaft 336. By rotation of the threaded shaft 336 the motor 29 may be shifted horizontally upon its bed plate 337.

In operation of the present invention the motor 29 is started. This drives the motor shaft 31 which in turn drives the vacuum pump 36 through the pulleys 32 and 35 and the belt 34. At the same time the pulley 33 is rotated. This drives the belt 37 leading around a pulley 38 on the shaft 39. In the event the clutch 329 is set the shaft will impart rotation to the pulley 41. This will drive the pulley 43 by means of a belt 42. Since the pulley 43 is mounted upon a transversely extending shaft 44 it will drive the worm gear 50. This will simultaneously drive the worm wheel 49 which lies in a horizontal plane and the worm wheel 182 which lies in a vertical plane. The worm wheel 49 is mounted upon a vertical shaft 48 and the worm wheel 182 is mounted upon the timing shaft 93. When the vertical shaft 48 is driven it will impart rotation to the spur gear 54 which is in mesh with the spur gear 55 mounted upon the shaft 56. As the spur gear 55 rotates it will impart a combined oscillating and reciprocating motion to the gear rock 58.

This in turn will drive the gear pinion 60 upon the vertical conveyor sprocket shaft 26. As the rack reciprocates the member 61 will rotate so that the pawl 64 on the disc 63 will engage the notch 62 and thus impart a partial rotation to the shaft 26. This only takes place when the member 67 is out of engagement with the notch 66 formed on the circumferential edge of the member 63. This disengagement occurs when the pin 71 on the gear 55 encounters the portion 70 of the bell crank lever 68. When rotation is imparted to the shaft 26 the sprocket 24 will rotate and drive the conveyor chain 22 as well as the idler sprocket 23 at the opposite end of the base structure 11. The gear ratio is so designed as to insure that the chain will move the distance represented by the spacing of four of the molds 75 so that they will simultaneously register at the blank feeding station 18, the forming and folding station 19, the measuring and filling station 20, the final closing station 21, the discharge station which occurs beneath the blank feed station 18.

Assuming that a set of empty molds 75 is in [in] its initial position beneath the various units of the blank feeding station 18 the blank feeding operation is as follows: The timing shaft 93 rotates the cam 96. This initially causes the lift rod 99 to move downwardly with the result that the arms 84 carrying the vacuum cups 83 will swing upwardly and contact the lowermost carton blank 10 in each of the magazines comprising uprights 79. At this time the shaft 93 will operate the cam 92 to move the plunger 89 downwardly in the cylinder 88, as shown in Fig. 9. This will cause a suction impulse to be created within the tube 87 so that a vacuum will be drawn in each of the vacuum cups 83. In synchronism with this action the cam 96 will lift the member 99 and will swing the arms 84 downwardly so that each of the suction cups 83 will pull the lowermost carton blank 10 from the magazine and place it in a horizontal plane where it may be engaged by the lug 103' of each of the feed chains 103. The chain 103 will then feed the carton blank horizontally and in the direction of the arrow a, as indicated in Fig. 10. The feeding operation of the chain is brought about by the cam 183 upon the timing shaft 93 which moves the cam roller 184 and the member 185. This causes the gear rack 187 to reciprocate vertically and rotate the pinion 188 which is carried upon the sprocket shaft 105. The alternate vertical reciprocation of the rack 187 will thus cause the upper run of the feed chain 103 to move forwardly and to thereafter move in a retracting direction.

Figure 15:
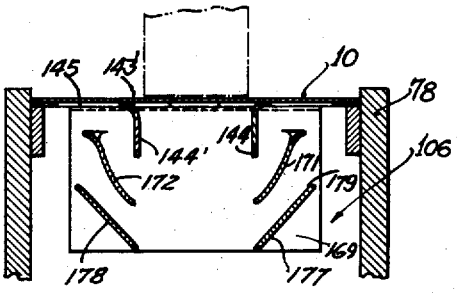
Fig. 15 is a view in vertical section through the folding die showing the same details as in Fig. 12 but with the carton blank in position preparatory to forming.
Figure 16:
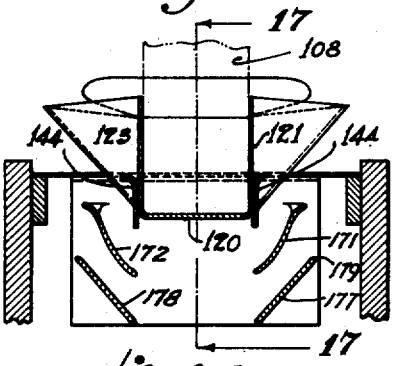
Fig. 16 is a view similar to Fig. 15 showing the forming plunger partly moved through the folding die and indicating the folding operation of the carton.

When the feed chain moves forwardly it will shift the carton blanks 10 to a horizontal position resting upon the top plate or table 107 and properly centered over the folding dies 106, as indicated in Fig. 15 of the drawing. It will be understood that the blanks were fed forwardly between the guide members of frame 78 and are thus held against lateral shifting action. When the blank is disposed over the folding die its fields 124 and 129 and the adjoining gusset portions will be over opening 145 and the fields of the blank 122 and 130 and the adjoining gusset portions will be over the opening 146. At this time the plungers 108 move downwardly in the direction of the arrow b, as indicated in Fig. 4. The downward movement of the plungers is controlled by the cam 118 upon the timing shaft 93. As the cam swings downwardly the lever arm 115 will swing downwardly in the direction of the arrow c. This will allow the cross-frame member 109' to move downwardly, and since it carries the standards 109 the plungers 108 will simultaneously move down to engage the carton blank 10 and to carry it through the die 106 upon which it rested. In this operation the end of the plunger 108 will engage the field 120 of the blank, forcing it down between the members 144 and 144'. As this takes place the fields 121 and 123 will fold up against the sides of the plunger 108 and the corner gusset sections will tend to fold at the opposite ends of the openings 145 and 146, as shown in Fig. 16.

Figure 17:
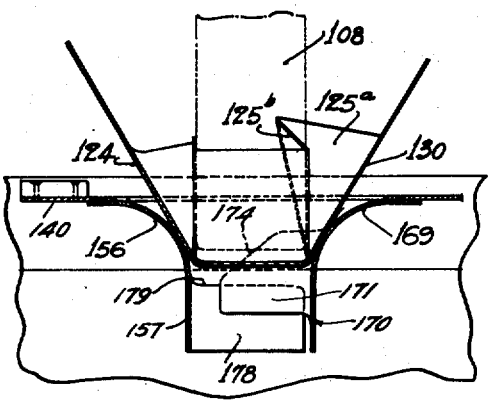
Fig. 17 is a view in vertical section as seen on the line 17—17 of Fig. 16 and indicates the manner in which the opposite sides of the carton from those shown in Fig. 16 are folded.
Figure 18:
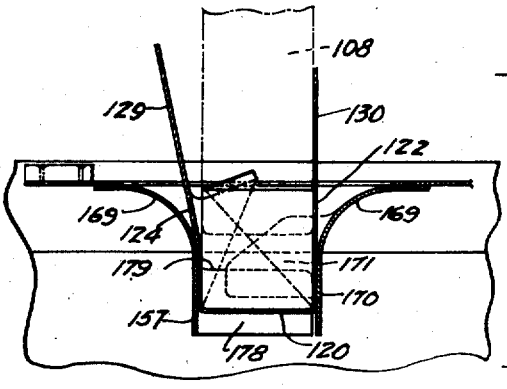
Fig. 18 is a view similar to Fig. 17 but indicates the carton in the final stages of folding.

As the plunger 108 continues to move downwardly, as indicated in Fig. 17, it will be seen that the field 130 will engage the curved member 169 and that the field 124 will engage the curved member 156. This will tend to force these fields in against the opposite sides of the plunger 108. As this takes place the gusset portions 125–a and 125–b will tend to fold over the field 123. The diagonal lines of the folds will then engage the inclined faces 174 of the folding blades 171 and 172, after which the diagonal fold edges of the gusset portions 128–a and 128–b at one side of the field 124 and 127–a and 127–b at the opposite side of the field 124 will fold over the previously folded gussets as the last named gussets engage the folding blades 177 and 178. This will cause a complete rectangular carton to be formed and folded as the carton continues downwardly, as indicated in Fig. 18 of the drawing.

The plungers 108 then carry the folded blanks into the molds 75 which are in register at the folding and forming stations. As the plungers 108 move downwardly between the sides of the molds 75 they will encounter the inclined faces of the fingers 201 and 202 shown in Fig. 23 of the drawing. These fingers will thus swing outwardly in the direction of the arrows d so that the bottom panel 120 of the carton will rest upon the member 194. Thus the upper edges of the gusset portions of the carton and the side walls 121 and 123 will tend to move outwardly beneath the shoulders 129 on the side walls, and when the plungers 108 are withdrawn the ends 207 of the fingers 202 will swing inwardly and hook over the folded edges of the carton, as indicated by dotted lines in Fig. 22. Here it will be seen that the carton fields 122 and 124 will be at opposite ends of the molds 75, and that the intervening wall sections shown in this figure of the drawing comprise field 121 which is innermost and against which gusset section 125–a rests. The gusset section 125–b is folded over gusset section 125–a and gusset section 128–a is folded against gusset section 125–b. The gusset portion 128–b is folded over the portion 128–a. A pocket will be formed therefore between the gusset sections 128–a and 128–b. The ends of the fingers 202 will hold the folded side walls in this position while the cartons are carried in the molds and placed beneath and in register with the set of discharge nozzles 123. It will be assumed that at this time the measuring cylinders 215 will be filled and will be in register with the folded and formed cartons. The piston 216 therein will be in its uppermost position and will hold the plunger rods 217 at the top of their strokes so that they may be engaged by the free ends of the levers 232. These levers are forced downwardly in the direction of the arrow e, as indicated in Fig. 5 of the drawing, and will force the ice cream from the cylinder 215 and into the carton therebeneath. This operation is brought about by movement of the cam 253 as it causes the lift rods 241 to be raised and lowered. In order to obtain exact quantities of material within the cartons the effective length of the rod 241 may be varied by adjusting it within the threaded fitting 238. It is to be understood that while the cylinders 215 are being emptied by the downward swinging movement of the levers 232 the cylinders 214 are being filled by the semi-solid material delivered to the manifold 219. This material will be forced upwardly into the cylinder 214 and will lift the piston therein until the space within the cylinder and beneath the piston has been filled. The position of the cylinders 214 and 215 will be interchanged during the period between the movement of the conveyor chain 22 to position a set of molds 75 at the various operating stations. The interchange of position of the cylinders 214 and 215 is brought about by an intermittent drive structure comprising Geneva gear elements 51 and 52. The element 51 is a disc mounted upon the shaft 48 and the element 52 is a Geneva cam mounted upon the shaft 43, thus an intermittent driving motion of the shaft 53 takes place in timed sequence with the operation of the timing shaft 93. As the shaft 53 rotates it will drive the gear 231 which in turn will drive the gear 230. The gear 230 will drive the gears 229 and the shaft 226 upon which they are mounted. The shafts 226 drive the gears 225, and since these gears are in mesh with the gears 224 carried by the measuring valves 213 these cylinders will rotate intermittently within the cylindrical shells 208. When the set of cartons has been filled at the measuring and dispensing station the drive chain 22 is again driven to bring the filled cartons to the closing station, as generally indicated at 21.

Figure 25:
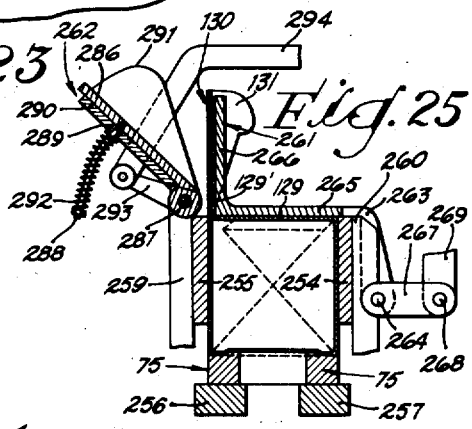
Fig. 25 is a view showing the structure disclosed in Fig. 24 and indicates the position when the inner top flap is folded.
Figure 26:
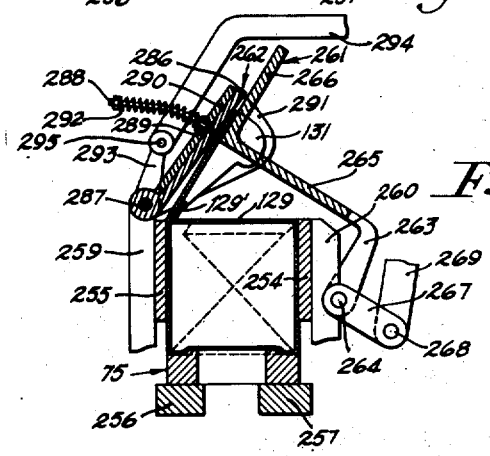
Fig. 26 is a view showing the closing device with the top cover partially closed.
Figure 27:
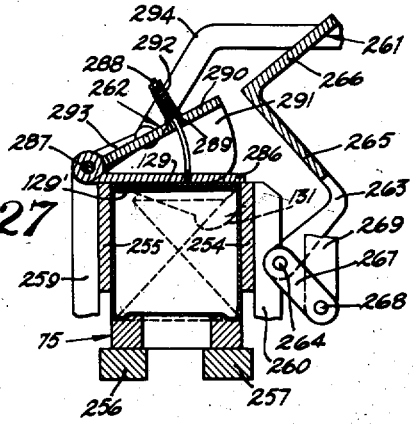
Fig. 27 is a view similar to that shown in Fig. 26 with the carton completely closed.

When the carton has reached the closing station the flaps 129 and 130 of the carton will be standing vertically. It is necessary to first fold the flap 129 down over the filled carton. This is done as shown in Fig. 6 by the operation of the cam 284 which [lifts] *depresses* the bar 278 and acts to swing the lever 267 upwardly [while] *thus* causing the folding structure 261 to swing downwardly over the top of the container. As this takes place the end tang 129' will be folded against the inner face of the field 130 of the carton blank as shown in Fig. 25. Operating in synchronism with the folding unit 261 is the final closing unit 262. This begins to fold over the top of the container as the folding unit 261 swings away from its folding position, as shown in Fig. 26 of the drawing. The members 286 and 290 [will] swing over the top of the container [and will fold] *until side members 291 come to rest on upper ends of side walls 195 and 196 of the mold 75. This halts rotation of member 290 with shaft 287 while member 286 continues to so rotate to a horizontal position (Fig. 27) in which it folds* the top field 130 down in a position to cover the field 129. [At this time] *During this action,* the side members 291 [will swing down to] hold the side tangs 131 and 132 flat and in [a] vertical [plane] planes. These tangs [will] *are thus caused to* enter the pockets formed between the folds of the gusset portions 128a and 128b on one side of the carton and 127a and 127b on the opposite side of the carton. As the tangs 133 and 134 are inserted into the pockets formed by the gussets they will be forced downwardly, as shown in Fig. 27, until the locking tangs 135 and 136 find the locking slits 137 and 138 at the fold of the gusset portions. These locking tangs will thus be forced through these slits to a locking position and will act to hold the folded side walls shown in Fig. 22 so that they will not spread and will not allow liquid or other extraneous material from finding its way inwardly between the folds to contaminate the contents of the package.

When the conveyor chain 22 is next actuated it will place the finally filled and closed containers in register with the members 132 disposed beneath the carton blank magazines. In this position the cam 328 will act to lift the rod 322. This in turn will cause the lever 314 to swing and will cause the ejector fingers 312 to swing in the direction of the arrow f. As these fingers sweep across the molds and between their upright sides the filled and closed cartons will be pushed from the molds 75 and may be carried away in suitable containers to be placed in a freezing compartment.

It will thus be seen that the machine here disclosed provides suitable and efficient means for forming, filling and closing cartons containing a food product in a manner to insure that the product will not at any time be touched with human hands, and that the structure may be maintained in a sanitary condition in conformity with the health laws of any community.

While [I] *we* have shown the preferred form of [my] *our* invention as now known to [me] *us*, it will be understood that various changes may be made in combination, construction and arrangement of parts by those skilled in the art, without departing from the spirit of the invention as claimed.

Having thus described [my] *our* invention, what [I] *we* claim and desire to secure by Letters Patent is:

1. In a packaging machine, means for closing a carton having vertical side walls including folded gussets, certain of which form pockets, and intermediate side walls at least one of which carry cover members for closing the top of said container, one of said cover members having side flaps to be introduced into the gusset pockets, which closing means includes a mold into which the carton is seated, inner cover folding means disposed at one side of said mold and adapted to fold an inner cover over the mouth of a carton, outer cover folding means disposed upon the opposite side of the mold and adapted to fold the outer cover over the inner cover, said outer cover carrying the side flaps, means carried by the outer cover folding means to fold the side flaps parallel to each other and at right angles to the cover portion whereby the side flaps will be inserted into the gusset pockets as the carton is closed, and synchronous driving means for the two folding means whereby they will operate in succession to close the top of the carton.

2. The structure of claim 1 including yieldable means permitting the side flap folding means to stand stationary while the outer cover folding member continues to move to the end of its folding stroke.

3. In a packaging machine, means for closing a carton which has vertical side walls, including folded gussets at opposite sides thereof, the outermost of said gussets forming pockets and intermediate side walls, each of which carries cover means for overlapping each other and closing the top of said container, one of said cover members having side flaps to be introduced into the gusset pockets, which closing means includes: a mold into which the carton is seated with the intermediate side walls at opposite sides of the mold, inner cover folding means disposed at the side of the mold upon which the associated intermediate side wall is positioned, said means adapted to fold the inner cover over the mouth of the carton, outer cover folding means disposed upon the opposite side of the mold and adapted to fold the outer cover over the inner cover, said outer cover carrying the side flaps, means carried by the outer cover folding means to fold the side flaps parallel to each other as the outer cover is folded over the mouth of the carton and to introduce said side flaps into the gusset pockets as the carton is closed, and synchronous driving means acting to move the first folding means to its folded position and to retract said means as the second folding means moves to its folded position.

ARDEN FARMS CO.,
By JOHN A. TONGUE,
*Vice President and Treasurer,*
*Assignee of Samuel H. Berch deceased.*

References Cited in the file of this patent

UNITED STATES PATENTS

| Number | Name | Date |
|---|---|---|
| 720,492 | Sedberry | Feb. 10, 1903 |
| 1,268,107 | Frehrs | June 4, 1918 |
| 1,964,122 | Johnson | June 26, 1934 |
| 2,241,942 | Berch | May 13, 1941 |
| 2,281,295 | Nicodemus, et al. | Apr. 28, 1942 |